(12) United States Patent
Hurley

(10) Patent No.: US 11,772,869 B2
(45) Date of Patent: Oct. 3, 2023

(54) MULTI-CHAMBER POUCH

(71) Applicant: Slim Chillers, Inc., Las Vegas, NV (US)

(72) Inventor: Philip Hurley, Las Vegas, NV (US)

(73) Assignee: Slim Chillers, Inc., Las Vegas, NV (US)

( * ) Notice: Subject to any disclaimer, the term of this patent is extended or adjusted under 35 U.S.C. 154(b) by 0 days.

(21) Appl. No.: 17/175,797

(22) Filed: Feb. 15, 2021

(65) Prior Publication Data

US 2021/0253324 A1    Aug. 19, 2021

Related U.S. Application Data

(60) Provisional application No. 62/976,054, filed on Feb. 13, 2020.

(51) Int. Cl.
| | |
|---|---|
| B65D 35/02 | (2006.01) |
| B29C 65/02 | (2006.01) |
| B65D 75/30 | (2006.01) |
| B65D 75/58 | (2006.01) |
| B32B 27/36 | (2006.01) |
| B32B 27/34 | (2006.01) |
| B32B 27/32 | (2006.01) |
| B32B 27/08 | (2006.01) |
| B32B 1/00 | (2006.01) |

(Continued)

(52) U.S. Cl.
CPC ............... *B65D 75/30* (2013.01); *B32B 1/00* (2013.01); *B32B 27/08* (2013.01); *B32B 27/32* (2013.01); *B32B 27/34* (2013.01); *B32B 27/36* (2013.01); *B65D 75/008* (2013.01); *B65D 75/5805* (2013.01); *C12G 3/04* (2013.01); *B32B 2255/10* (2013.01); *B32B 2255/26* (2013.01); *B32B 2307/514* (2013.01); *B32B 2307/7244* (2013.01); *B32B 2439/40* (2013.01); *B32B 2439/70* (2013.01)

(58) Field of Classification Search
CPC .. B65D 75/30; B65D 75/008; B32B 2439/70; B32B 2439/40; B32B 2307/7244; B32B 2307/514; B32B 2255/26; B32B 2255/10; B32B 27/36; B32B 27/34; B32B 27/32; B32B 27/08; B32B 1/00; C12G 3/04
See application file for complete search history.

(56) References Cited

U.S. PATENT DOCUMENTS

2013/0196044 A1* 8/2013 Winston ............... A23G 9/045
                                                         215/382

FOREIGN PATENT DOCUMENTS

JP       2011068367    *  4/2011

* cited by examiner

*Primary Examiner* — Ellen S Hock
(74) *Attorney, Agent, or Firm* — Russell Manning, FisherBroyles, LLP

(57) ABSTRACT

A multi-chamber pouch is provided having two or more three separate chambers that are stacked. The pouch includes two outer sheets formed of low-oxygen transfer material and one or more interior sheets are disposed between facing inside surfaces of the outer sheets such that all the sheets are stacked face-to-face. Peripheral edges of the sheets are sealed together (e.g., in conjunction with insertion of product) to form fluid tight chambers. In an arrangement using two interior sheets, three chambers are formed between the (Continued)

outer sheets. In an arraignment, alcohol containing liquid products are sealed within the chambers. Such a product may be frozen to provide an alcoholic ice-confection.

8 Claims, 6 Drawing Sheets

(51) Int. Cl.
*C12G 3/04* (2019.01)
*B65D 75/00* (2006.01)

MULTI-CHAMBER POUCH

CROSS REFERENCE

The present application claims the benefit of the filing date of U.S. Provisional Application No. 62/976,054 having a filing date of Feb. 13, 2020, the entire contents of which is incorporated herein by reference.

FIELD

The present disclosure relates to a flexible liquid beverage product package having a plurality of individual chambers. More specifically, the present disclosure is directed to a multi-chamber package having three overlaying chambers.

BACKGROUND

Flexible pouches are known for use in packaging consumable liquid products. By way of example, a number of beverages, such as juices and other flavored drinks, are often sealed in flexible pouches. Commonly, these beverages may be consumed directly from the pouch via, for example, a pointed straw use to pierce the pouch. Similar flexible pouches are utilized for more viscous fluids such as puddings and yogurts and freeze popsicles where an end of the pouch is removed (e.g., along a tear line) to access the contents of the pouch.

Some prior art pouches have provided separate chambers that keep two or more products or product components separated. In such an arrangement, two or more separate chambers holding separate product components may be opened and mixed shortly prior to consumption. Such packaging may be beneficial for products having a short shelf life once mixed. Such prior multi-chamber packages typically utilize first and second face sheets (e.g., such as foils, polymers, etc.) that are sealed together (e.g., heat sealed/welded, adhered etc.) along various sealing lines or seams. In such an arrangement, the separate chambers are most commonly disposed side-by-side.

SUMMARY

Aspects of the presented disclosure are based on the recognition by the inventor that, in many instances, it may be desirable for products within flexible pouches to have an extended shelf life. By way of example, when packaging alcoholic beverages, contents of a pouch may have a long shelf life as the content typically do not expire if they are not exposed to oxygen. That is, if pouch materials provide an effective long-term oxygen barrier (i.e., the material has a low-oxygen transfer rate), the contents may be stored for extended periods of time. The inventor has further recognized that flexible materials (i.e., suitable for forming product pouches) having low oxygen transfer rates are typically much more expensive than materials more commonly utilized for flexible pouch packaging. Further, when such materials are utilized to form a multi-chamber pouch where, for example, separate chambers are disposed side-by-side, the amount of such higher cost low-oxygen transfer materials increases significantly. Accordingly, it would be desirable to produce a multi-chamber pouch having a low oxygen transfer rate while reducing the amount of low oxygen transfer material utilized to form the pouch.

In an arrangement, a multi-chamber pouch is provided having two, three or more three separate chambers. The pouch includes two outer sheets formed of low-oxygen transfer material. At least one or two (more in some arrangements) interior sheets are disposed between facing inside surfaces of the outer sheets such that all the sheets are stacked face-to-face. In a non-limiting arrangement where the sheets are rectangular, three edge surfaces are sealed together (e.g., heat sealed/welded) to form fluid tight chambers. In an arrangement using a single interior sheet, two chambers are formed between the two outer sheets. In an arrangement using two interior sheets, three chambers are formed between the outer sheets. Different liquid/fluid products may be inserted into the separate chambers at which time the fourth edge surface (e.g., for a rectangular pouch) may be sealed thereby sealing the products in the separate chambers. Notably, the interior sheets may be made from a different (e.g., less expensive) material than the outer sheets. That is, as the interior sheets are sealed between the low-oxygen transfer outer sheets, these interior sheets may be formed from materials having higher oxygen transfer rates as they are isolated from any source of oxygen (e.g., the atmosphere). Accordingly, this design permits producing a multi-chamber package having a long shelf life due to low oxygen transfer rates while reducing the amount of low-oxygen transfer materials required to form the package.

In an arrangement, the multi-chambered pouch is used to produce an ice-confection product. The product may include different liquid product in the separate chambers. The liquid products may be frozen. In a further arrangement, the liquid products may include alcohol.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Disclosed herein is a multi-chamber flexible pouch. In the illustrated embodiment, the pouch has three separate chambers that may be filled with three different liquid products, which may subsequently be frozen. However, it will be appreciated that in other embodiments, the pouch may have two chambers, or the pouch may have more than three chambers. The pouch is formed from two outer sheets formed of low-oxygen transfer material with at least one and more typically two interior sheets sandwiched between facing inside surfaces of the outer sheets. That is, all the sheets (i.e., outer sheets and inner sheets) are stacked face-to-face. Initially, three sides or edge surfaces of the stacked sheets are sealed together (e.g., heat sealed/welded) to form fluid tight chambers. Different liquid products may be inserted into the separate chambers at which time the fourth edge surface may be sealed thereby sealing the products in the separate chambers. In the presented embodiment, the interior sheets are made from a different (e.g., less expensive) material than the outer sheets. More specifically, the interior sheets lack multiple layering (e.g., low oxygen transfer layer) and may have a higher oxygen transfer rate in comparison to the outer sheets. As the interior sheets are sealed between the low-oxygen transfer outer sheets, the interior sheets do not require low oxygen transfer rates that provide extended shelf life of the enclosed products. That is, the outer sheets provide the oxygen barrier for the package.

Figure 1A:
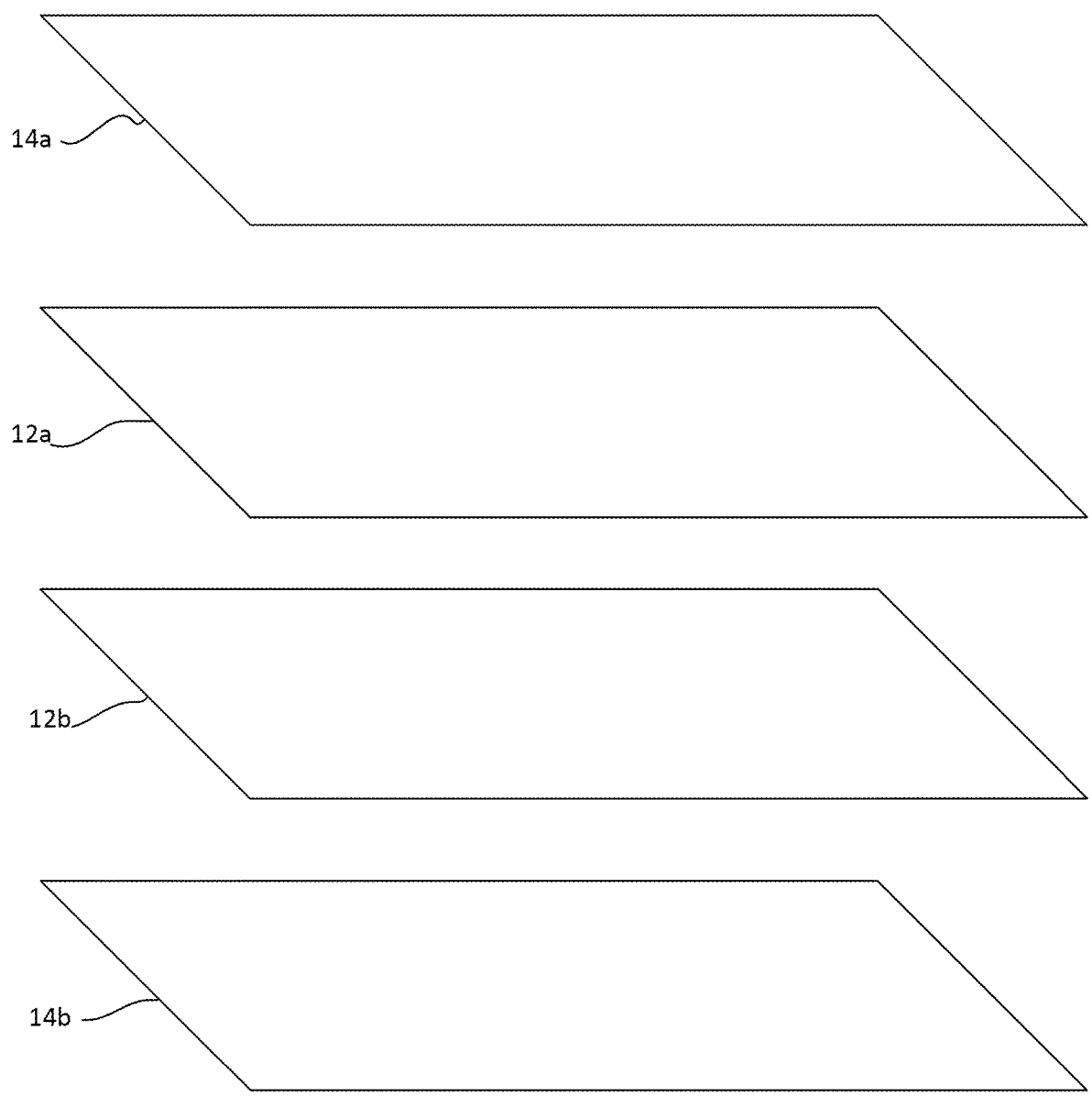
FIG. 1A illustrates four flexible sheets that may be combined to form the multi-chamber pouch in accordance with the present disclosure.
Figure 1B:
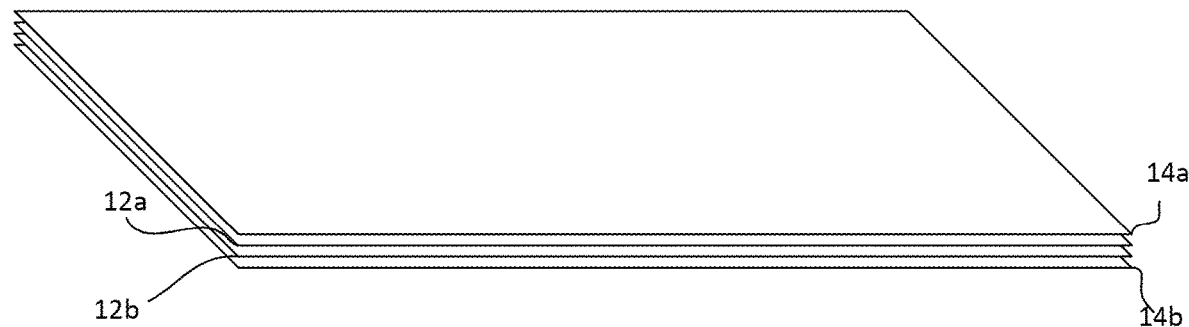
FIG. 1B illustrates the four sheets of FIG. 1 as sandwiched together.
Figure 1C:
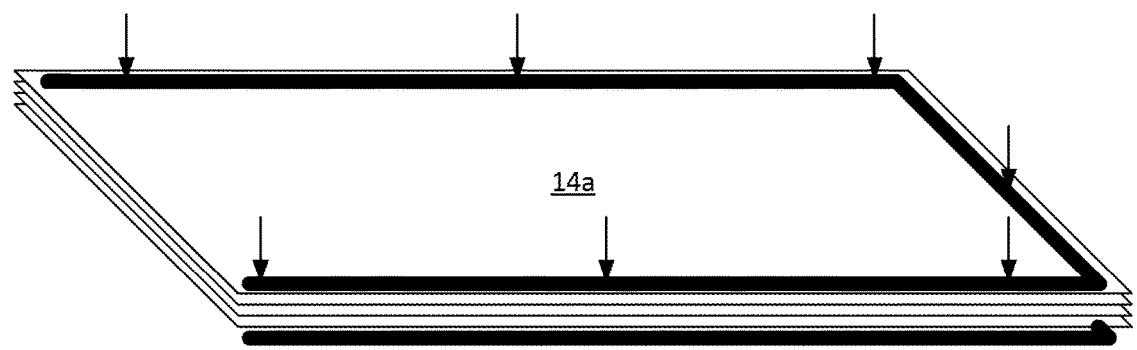
FIG. 1C illustrates heat sealing three sides of the sheets of FIB. 1B.
Figure 1D:
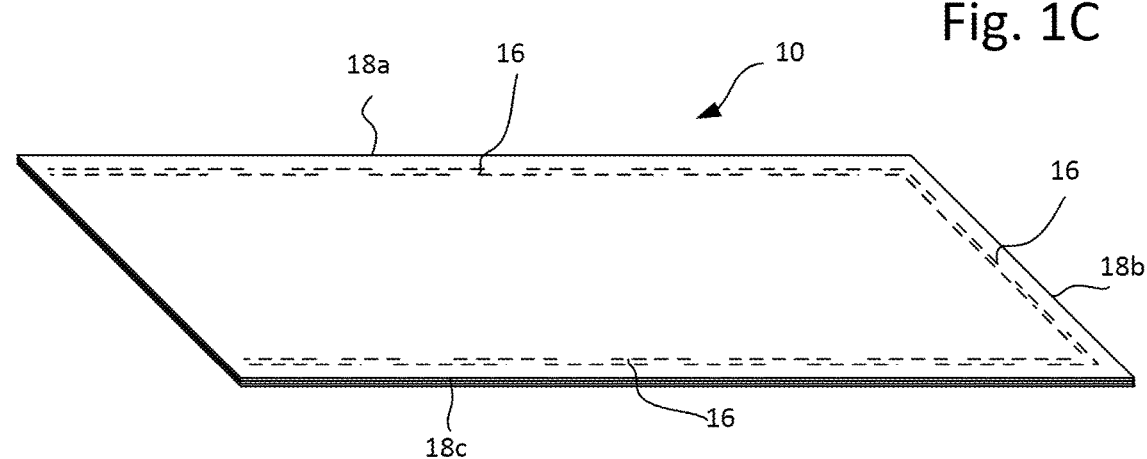
FIG. 1D illustrates an open-ended multi-chamber pouch after the heat-sealing process of FIB. 1C.

FIGS. 1A-1D illustrate the use of four separate sheets to form a multi-chamber flexible pouch 10. As illustrated in FIGS. 1A and 1B, initially, four at least partially polymeric panels or sheets are disposed in a face-to-face relationship. More specifically, two inner sheets 12a, 12b (hereafter '12' unless specifically referenced) are disposed between two outer sheets 14a, 14b (hereafter '14' unless specifically referenced). As shown, the sheets are disposed face-to face where a bottom surface (e.g., bottom face) of an upper sheet is disposed over the upper surface (e.g., top face) of an underlying sheet. Once the four sheets are sandwiched together (e.g., FIG. 1B), three edges 18a, 18b and 18c of the sheets 12, 14 may be sealed together using any one of a plurality of known means to seal the at least partially polymeric sheets (e.g., polymeric film) to one another. By way of example, the sheets may be melted together in a heat press application (e.g., utilizing a heated sealing bar(s)) as illustrated in FIG. 1C. Alternatively, ultrasonic welding may be utilized. Regardless of the process utilized, the sheets 12, 14 are connected to form a seal 16 on three sides 18a, 18b, 18c of the pouch 10. Though illustrated as sealing three edges, it will be appreciated that two opposing edges (e.g., 18a, 18b) of the sheets may be sealed together in a continuous process where each sheet is fed from a supply roll. In such an arrangement, the four sheets may be sealed together to produce a blank of four sheets having opposing edges sealed together. In such an arrangement, the blank may be cut to a desired length at which time one of the ends (e.g., 18c) may be sealed.

Figure 2:
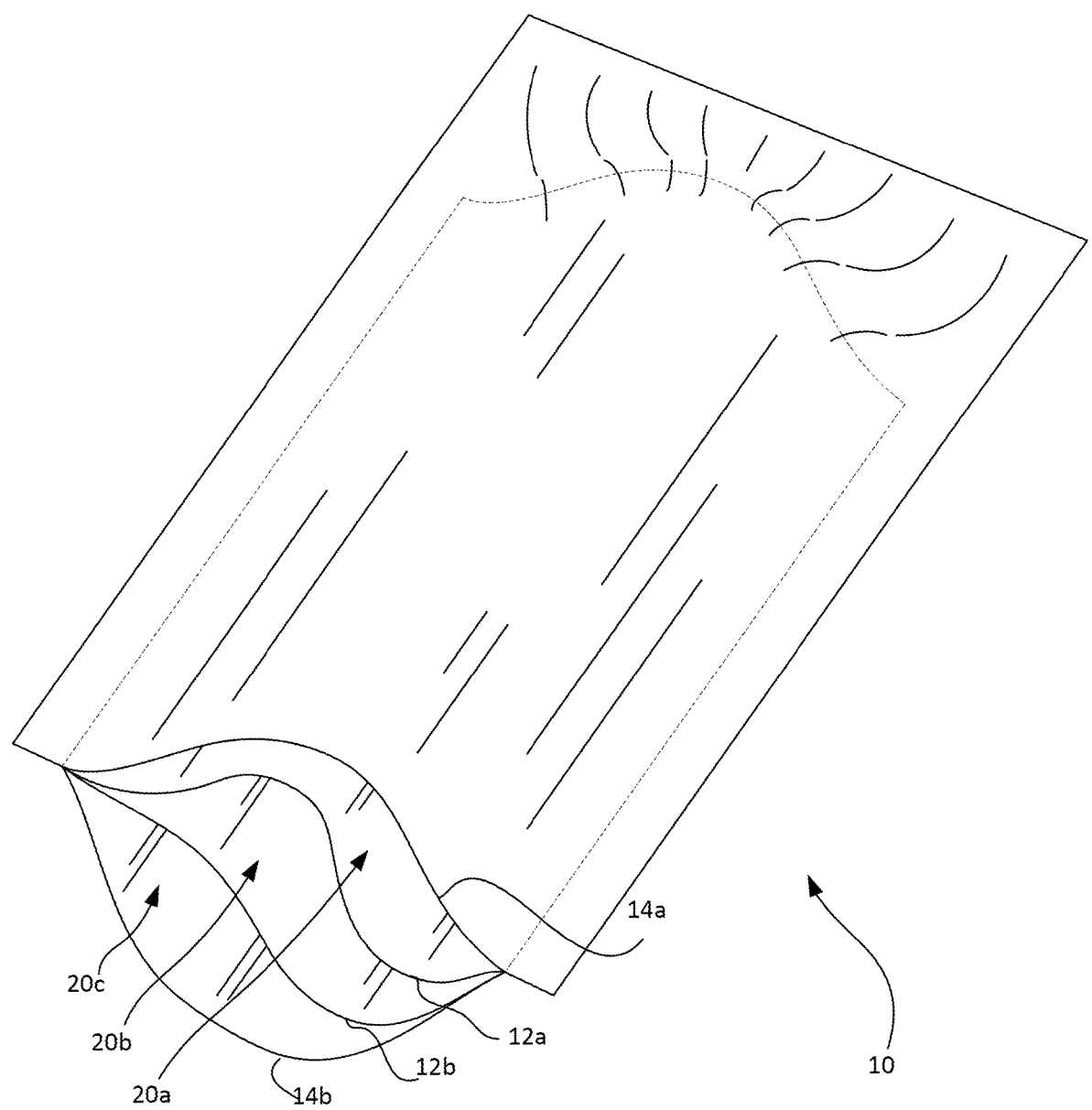
FIG. 2 illustrates a perspective view of the multi-chamber pouch of FIGS. 1D.

Once three edges of the sheets 12, 14 are sealed, the four sheets define an open-ended pouch 10 having three internal chambers. This is illustrated in FIG. 2 which shows the pouch 10 were opposing side edges 18 are partially disposed toward one another to separate the individual sheets at the unsealed end (e.g., open end) of the pouch 10. As shown, the pouch includes three stacked internal chambers 20a, 20b and 20c. More specifically, a first chamber 20a is formed between the first outer sheet 14a and the first inner sheet 12a, a second chamber 20b is formed between the first inner sheet 12a and the second inner sheet 12b, and a third chamber is formed between the second inner sheet 12b and the second outer sheet 14b. Each of the chambers is formed of at least sheet that is shared with an adjacent chamber.

Figure 3A:
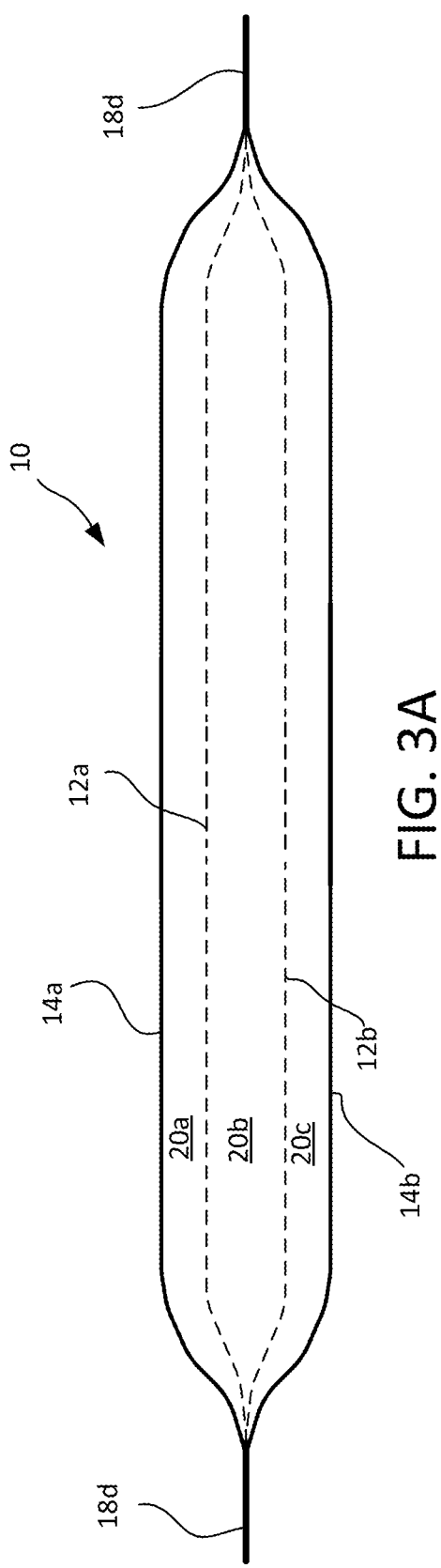
FIG. 3A illustrates a side view of one embodiment of multi-chamber pouch in accordance with the present disclosure.
Figure 3B:
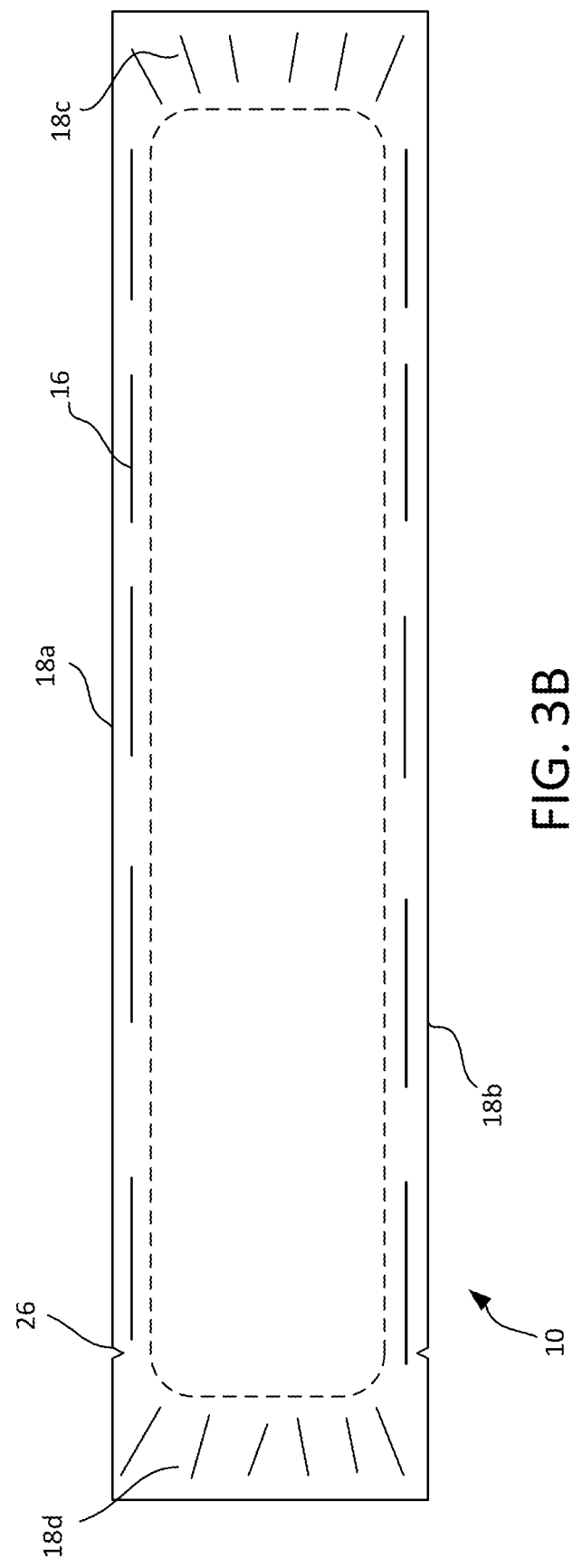
FIG. 3B illustrates a top view of one embodiment of a multi-chamber pouch in accordance with the present disclosure.
Figure 3C:
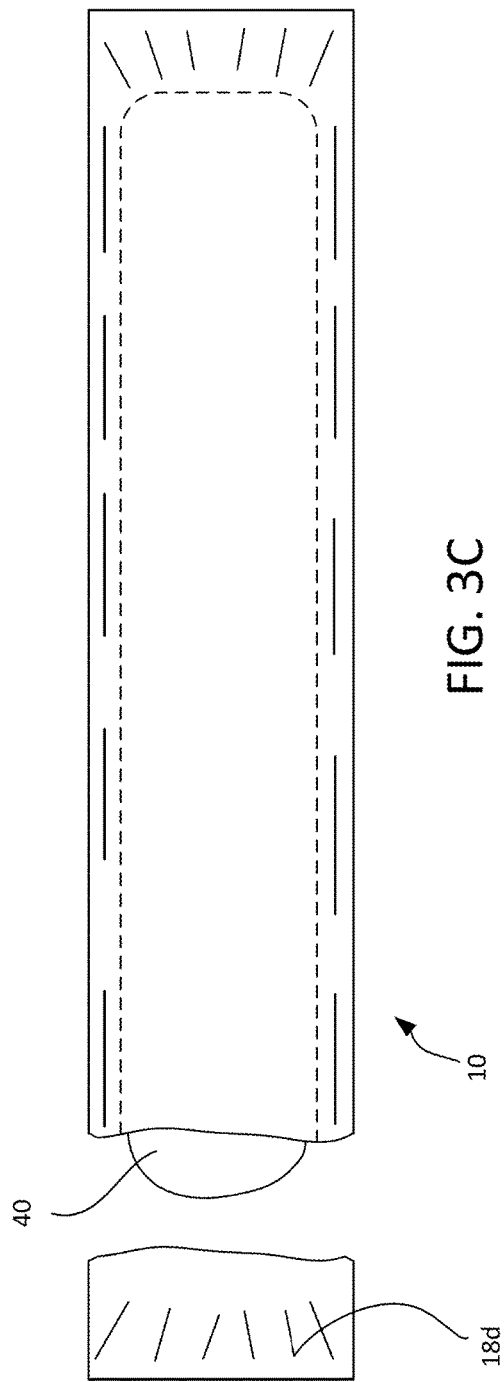
FIG. 3C illustrates the multi-chamber pouch of FIG. 3B with an end removed to expose the contents of multiple chambers.
Figure 3D:
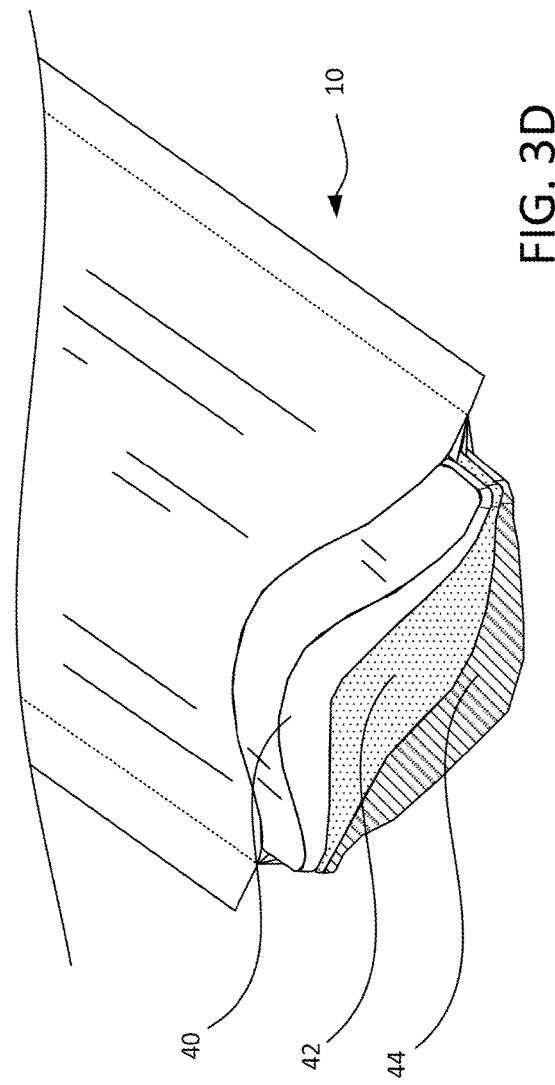
FIG. 3D illustrates three separate frozen products extending out an open end of the multi-chamber pouch.
Figure 4:
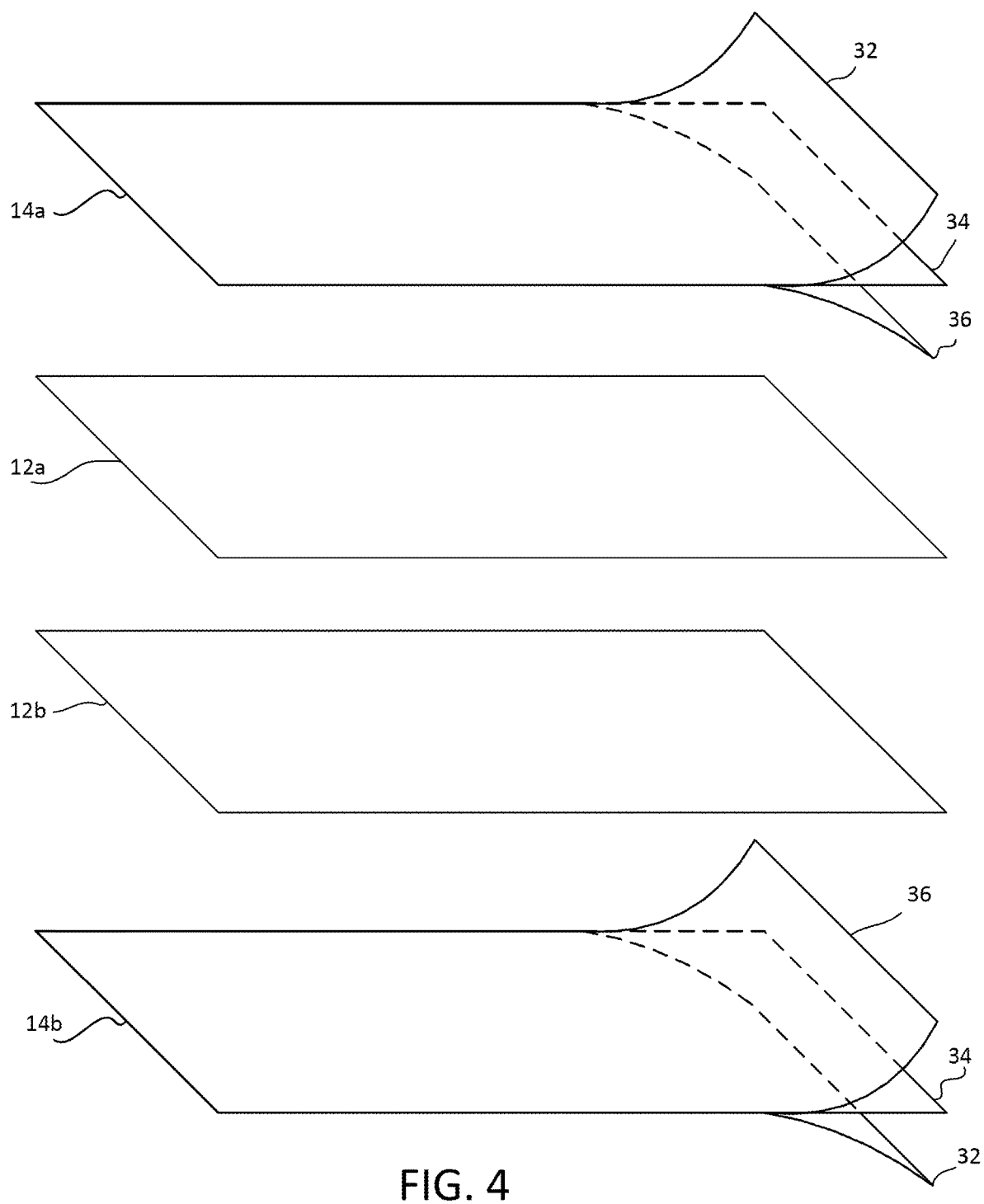
FIG. 4 illustrates the multi-layer films forming the outer layers of the multi-chamber pouch

The three chambers 20a-c may be filled with any of a variety of liquid products, which may subsequently be frozen. In an application, the pouch will be utilized to hold separate products that will be mixed or consumed together when the pouch 10 is opened. In any application, the separate chambers 20a-c may be filled with product. Once the separate chambers are filled with product, the open end of the pouch 10 may be sealed to seal the products in the separate chambers. This is illustrated in FIGS. 3A and 3B which illustrate side and top views, respectively, of the fully sealed pouch. As shown, both sides 18a, 18b as well as both ends 18c, 18d are sealed thereby sealing the product in the three interior chambers 20a-c. As illustrated, the pouch 10 may include one or more notches 26 along the sides 18a, 18b to define a frangible tear line across the pouch. Along these lines, a user may grasp the pouch 10 and remove an end 18d from pouch 10 thereby simultaneously opening all three chambers of the pouch. See FIG. 3C. In the case of frozen contents, this may expose different products 40, 42 and 44 contained in the different chambers. See FIG. 3D. When the products 40, 42 and 44 are frozen, a user may then press the products out of the pouch for consumption. For liquid products, all chambers may be opened and poured into a container and mixed.

As discussed above, it may be desirable that the pouch have a long shelf life. Along these lines it may be desirable that the outer sheets 14a, 14b limit oxygen transfer into the pouch 10. To provide an effective oxygen barrier, the at least the sheets (e.g., polymeric sheets) that form the outer surfaces (i.e., outer sheets 14) of the package/pouch are made from a multilayer film to prove enhanced barrier characteristics while maintaining necessary sealing characteristics. Most commonly, the multilayer film will include at least three layers, including but not limited to, an outermost layer 32, a middle layer 34, and an inner sealing layer 36 and optionally one or more adhesive or tie layers there between. That is, each of the layers 32-36 may be adhered (e.g., laminated) to its adjacent layer(s). The inner sealing layer 36 is made from a material that is compatible with the intended contents of the pouch and is also capable of forming seals with the adjacent inner sheet 12. Most commonly, the inner layer 36 is a heat-sealable material the readily melts at predetermined temperatures to seal with an adjacent material layer (e.g., inner sheet).

The outer layer 32 and/or the middle layer 34 may form a structural or abuse layer that may include, without limitation, oriented polyester, oriented polypropylene and/or oriented nylon. The outer layer 32 and/or the middle layer 34 can form a barrier layer that limits an oxygen exchange rate through the outer sheet 14 that, depending on which atmospheric conditions (oxygen, humidity, light, and the like) can potentially affect the product inside the pouch. In an embodiment, the barrier layer can be a polyvinyl alcohol (PVOH) coated polyester. The barrier layer may also be manufactured from a metallized oriented polypropylene (PP) or oriented polyethylene terephthalate (PET), ethylene vinyl alcohol (EVOH), aluminum foil, nylon or biaxial oriented nylon, blends or composites of the same as well as related copolymers thereof. Barrier layer thickness will depend on the sensitivity of the product and the desired shelf life. The outer layer 32 typically has a higher heat resistance (e.g., melting temperature) than the inner layer 36 to prevent the outer surface from sticking to a sealing device during manufacture.

The inner or sealing layer 36 typically is exposed to the contents of the pouch (e.g., outer chambers of the pouch in the present embodiment). This layer may be selected to have minimum effect on taste or color of the contents and to allow for bonding with an adjacent sheets (e.g., inner sheet 12). The sealing layer 36 is typically a polymer layer that can be melt-bonded to similar or identical materials (sealed) at temperatures typically below the below the melting temperature of the outermost layer. That is, the outer layer has a higher melt temperature than the inner layer so that the appearance of the outer layer will not be affected by the sealing process and such that the outer layer will not stick to the jaws of the sealing bar. Typical polymers utilized to form the inner sealing layer include, without limitation, ethylene copolymers, such as low-density polyethylene (LDPE), linear low-density polyethylene (LLDPE), or other copolymers of ethylene with vinyl acetate to name a few.

The inner sheets 12a, 12b of the pouch 10 do not need to provide structural strength or the same barrier characteristics (e.g., oxygen barrier properties) for the pouch as these sheets are sealed within the outer sheets 14. However, an inner sheet 12 must effectively bond to the inner sealing layer 36 of adjacent outer sheets 14 and/or adjacent inner sheets 12. Likewise, facing surfaces of adjacent inner sheets (e.g., 12a, 12b) must effectively bond to one another. Accordingly, the inner sheets 12 may be formed of the same material as the inner sealing layer of the multilayer outer sheets. Further, the inner sheets may be a single layer film such that their top and bottom surfaces are heat sealable. Alternatively, the inner sheets may be a multilayer film (e.g., three layers) where the outer layers are the same or similar material as the sealing layer of the outer sheets. In such an embodiment, a middle layer of such a multilayer inner sheet may be a structural and/or barrier layer.

When utilized to make the disclosed multi-chamber pouch, it will be appreciated that the outer sheets 14a, 14b may be configured identically (e.g., identical multilayer films) or configured differently. For instance, the outer sheet forming a front surface of the product packaging may be substantially transparent while an outer sheet forming a back of the product packaging may be opaque. Further the two outer sheets 14a, 14b may utilize different combinations of films. However, it will be appreciated that each sheet 14a, 14b will typically utilize the same interior film layer 36 for bonding purposes. In an arrangement, all layers of the pouch may be transparent or translucent.

In one specific embodiment, the outer sheets 14 of the multi-chamber pouch utilizes an outer layer 32 formed of a PVOH coated polyester (12 micron), a middle layer formed of a biaxially oriented Nylon (15 micron) and an inner sealing layer of low-density polyethylene with 3% ethyl vinyl acetate. This material composition is comprised of unusually high oxygen barrier polyester laminated to an oriented nylon that stretches in a machine direction and a web direction for strength and which may be laminated to a special polyethylene with an infusion of EVA for flex crack resistance and freezer applications.

Other flexible pouch products are most commonly a simple two-layer, non-barrier laminate (either opaque, foil, or clear), relying on reduced temperatures (frozen) to afford an extended freezer-life. The presented lamination is preferably a clear combination of substrates which offer high-barrier properties to significantly extend "room temperature" shelf life of up to four years, thereby reducing waste, spoilage, and negative environmental impact. The proposed lamination also significantly reduces the potential for sickness due to bacterial off-gassing which can potentially be found in products that do not offer similar protections.

The multi-chamber pouch having two or more stacked chambers is especially desirable for use with frozen consumable products. Such frozen products may be sealed within the separate chambers of the pouch in a liquid or semi-liquid form and then frozen. This allows maintaining the frozen products (e.g., 40, 42 and 44; see FIG. 3D) as separate, un-mixed layers (e.g., homogenous product layers) prior to consumption. Once frozen, the pouch may be opened and the multiple products may be pushed out for consummation as a multilayered ice-confection. By way of example, the outer chambers 20a, 20c may include a first product (e.g., a fruit juice product) while the mid-chamber 20b includes cream-based product. When frozen, the resulting ice-confection may be similar to a Creamsicle®.

The multi-chambered pouch may also be utilized for frozen alcoholic ice-confections. The freezing point alcoholic mixtures (e.g., mixtures of vodka, tequila, rum, whiskey, liqueurs etc.) is dependent on its alcohol by volume (or its proof). Generally, the lower the alcohol content, the warmer the freezing point. Conversely, the higher the alcohol content, the colder the freezing point. Generally, alcohol mixtures with an alcohol-by-volume (ABV) of less than about 15% will freeze in a freezer at approximately 0° F. However, it has been found that the hardness of the resulting frozen product will vary based on the ABV of the alcohol containing product. Along these lines, an alcohol ice-confection product may be produced having outer layers that are crunchy similar to the outer layers of a Creamsicle® with an softer inner layer similar to the ice cream center of a Creamsicle®. Through experimentation, it has been found providing products in the outer chambers 20a, 20c with an ABV between about 3% and about 10% with a product in the mid-chamber 20b with an ABV between about 8% and 13% results in an alcohol ice-confection having a texture similar to a Creamsicle®. Though discussed with having overlapping ranges, it will be appreciated that the softest layer will have an ABV that is higher than the harder layers (e.g., typically the outer layers). By way of example, to make a strawberry colada ice-confection, the above described pouch may include a strawberry daiquiri 8% ABV fruit flavored product in an outer chamber 20a, a vanilla rum cream 11% ABV product in the mid-chamber 20b and a piña colada 8% ABV fruit flavored product in the other outer chamber 20c. By way of further example, to make an orange vanilla cream ice-confection product, the above described pouch may include an orange rum cocktail 8% ABV fruit flavored product in an outer chamber 20a, a vanilla rum cream 11% ABV product in the mid chamber 20b and an orange rum cocktail 8% ABV fruit flavored product in the other outer chamber 20c.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A multi-chamber flexible pouch comprising: first and second outer sheets wherein the outer sheets are multilayered sheets each including at least a low-oxygen transfer barrier layer and a sealing layer; and at least one inner sheet disposed between facing surfaces of the first and second outer sheets, the at least one inner sheet being a single layered sheet, wherein the outer sheets and inner sheet(s) are stacked face-to-face and peripheral edges of the facing surfaces of the first and second outer sheets are sealed to peripheral edges of the at least one inner sheet to form at least a first chamber formed between the first outer sheet and the first inner sheet; a second chamber formed between the first inner sheet and the second inner sheet; and a third chamber formed between the second inner sheet and the second outer sheet, wherein each chamber shares at least one sheet forming a chamber with an adjacent chamber,
wherein the first chamber includes a first liquid product; the second chamber includes a second liquid product; and the third chamber includes a third liquid product, wherein two of the first, second, and third liquid products have a first alcohol by volume (ABV) and the other of the first, second, and third liquid products have a second alcohol by volume (ABV) different from the first alcohol by volume.

2. The flexible pouch of claim 1, wherein the at least one inner sheet comprises:
first and second inner sheets disposed between the facing surfaces of the first and second outer sheets, wherein the first and second inner sheets are single layered sheets.

3. The flexible pouch of claim 1, wherein the sealing layer forms the facing surface of the outer sheet.

4. The flexible pouch of claim 3, wherein the inner sheet comprises the same material as the sealing layer of the outer sheet.

5. The flexible pouch of claim 1, wherein the multilayered sheet further comprises:
a structural layer laminated to at least one of the barrier layer and the sealing layer.

6. The flexible pouch of claim 5, wherein:
the barrier layer comprises a PVOH coated polyester;
the structural layer comprises an oriented Nylon; and
the sealing layer comprises a low-density polyethylene.

7. The flexible pouch of claim 1, wherein two of the first second and third liquid products have an alcohol by volume (ABV) of between 3% and 9% and the other of the first, second and third liquid products has an ABV of between 10% and 15%.

8. The flexible pouch of claim 1, further comprising a frangible tear line, wherein the tear line permits simultaneously opening the first second and third chambers.

* * * * *